United States Patent [19]

Peterson et al.

[11] Patent Number: 4,752,764

[45] Date of Patent: Jun. 21, 1988

[54] ELECTRONIC TIMING AND RECORDING APPARATUS

[75] Inventors: Dean M. Peterson, Escondido; Roy H. Seim, San Diego; Dennis R. Neary, Encinitas, all of Calif.

[73] Assignee: Eastman Kodak Company, Rochester, N.Y.

[21] Appl. No.: 947,323

[22] Filed: Dec. 29, 1986

[51] Int. Cl.[4] ......................... G08B 23/00; H04N 7/18

[52] U.S. Cl. ................................ 340/323 R; 340/937; 340/309.15; 358/108; 358/112; 358/125; 346/107 B

[58] Field of Search .... 340/323 R, 937, 309.15-309.5; 358/105-108, 125, 142, 183, 112; 346/107 B, 107 A, 107 R, 1.1; 354/105, 106, 109

[56] References Cited

U.S. PATENT DOCUMENTS

| | | | |
|---|---|---|---|
| 3,883,684 | 5/1975 | Ikegami et al. | 358/108 |
| 3,890,463 | 6/1975 | Ikegami et al. | 358/108 |
| 4,523,204 | 6/1985 | Bovay | 358/108 |

*Primary Examiner*—Donnie L. Crosland
*Attorney, Agent, or Firm*—William F. Noval

[57] ABSTRACT

The disclosed apparatus electronically times and records a moving object as it travels over a measured course. The apparatus is especially useful in recording and timing an athlete running over a measured course in order to determine the overall athletic prowess of the athlete. The apparatus provides more accurate and uniform testing of an athlete's ability to run a predetermined distance as fast as possible. The apparatus includes a plurality of ultrasonic detectors positioned in predetermined spaced relationship along a course over which an athlete runs (object moves). A sequence of RF detection signals are sent to a timing circuit which computes the elapsed times of the athlete (object) over the course. The times are recorded along with video information produced by a video camera. When the timing information and recorded scene are played back on a video monitor, the timing information is displayed along with the video image to facilitate analysis of the recorded event.

3 Claims, 5 Drawing Sheets

FIG. 4
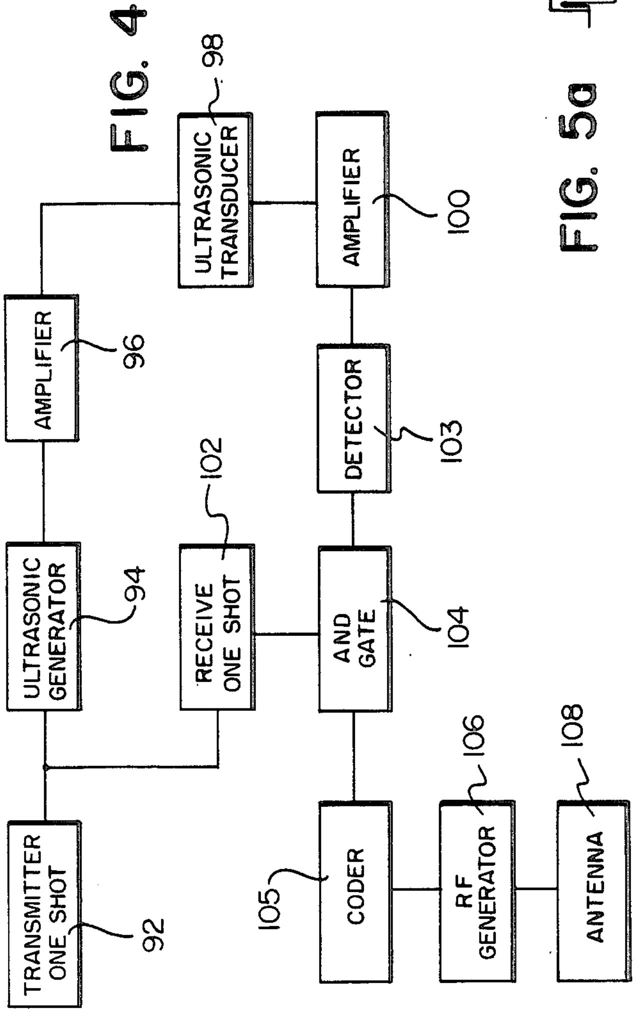
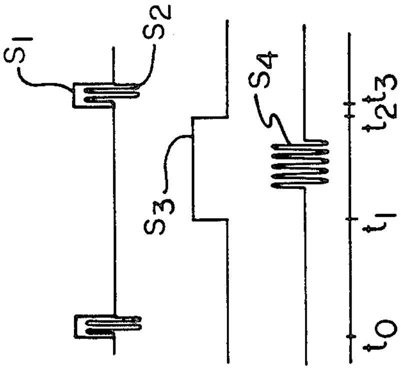
FIG. 5a
FIG. 5b
FIG. 5c

ELECTRONIC TIMING AND RECORDING APPARATUS

BACKGROUND OF THE INVENTION

This invention relates in general to apparatus for electronically timing and recording a moving object as it travels over a measured course. More particularly, this invention relates to apparatus for establishing precision timing for athletic events in conjuncton with a video recording of the event.

The timing of certain athletic events is an important part of determining overall athletic prowess. An athlete's ability to run a fast forty-yard dash reveals his ability in other athletic endeavors according to leading biomechanists. In fact, athletic scholarships are often awarded with this single skill as an important factor in the selection. Therefore, it is of importance to standardize the technique for accurately and uniformally obtaining the time results of these tests. Further it is desirable to record the event with date, time and speed graphically displayed. In addition, it is desirable to record the event for archival purposes as well as to train the athlete.

SUMMARY OF THE INVENTION

According to the present invention, there is provided apparatus for electronically timing and recording a moving object as it travels over a measured course and especially for electronically timing and recording an athlete as he runs a prescribed distance. The apparatus is easy to use, rugged in construction, and adapted to be used in an outdoor environment. According to an aspect of the invention, the apparatus includes a plurality of ultrasonic detectors positioned in predetermined, spaced relationship along a course which is to be traveled over by a moving object such as a running athlete. The detectors produce a sequence of RF detection signals which are sent to a timing circuit means. A video camera and recorder are provided for capturing and recording a sequence of video frames depicting the travel of the object over the course. Simultaneously, the timing circuit means computes the elapsed times of travel of the object over the course as a function of the sequence of detection signals and records the timing information along with the video information. Upon playback on a video monitor, the sequence of video frames depicting the travel of the object over the course is combined with the timing information relating to the captured scene. According to an aspect of the invention, the elapsed times are displayable in sequence in the corners of a displayed image. According to another aspect of the invention, the timing circuit is initiated either by means of a manually actuated control signal or by an RF detection signal produced by a detector which detects the start of travel of the object over the course.

BRIEF DESCRIPTION OF THE DRAWINGS

In the following description of the drawings, like elements are numbered with like numbers.

FIG. 4 is a block schematic diagram of the ultrasonic detector of the apparatus of FIG. 1;

FIGS. 5*a*, 5*b*, and 5*c* are timing diagrams illustrating the operation of the ultrasonic detector of FIG. 4;

DESCRIPTION OF THE PREFERRED EMBODIMENT

Figure 1:
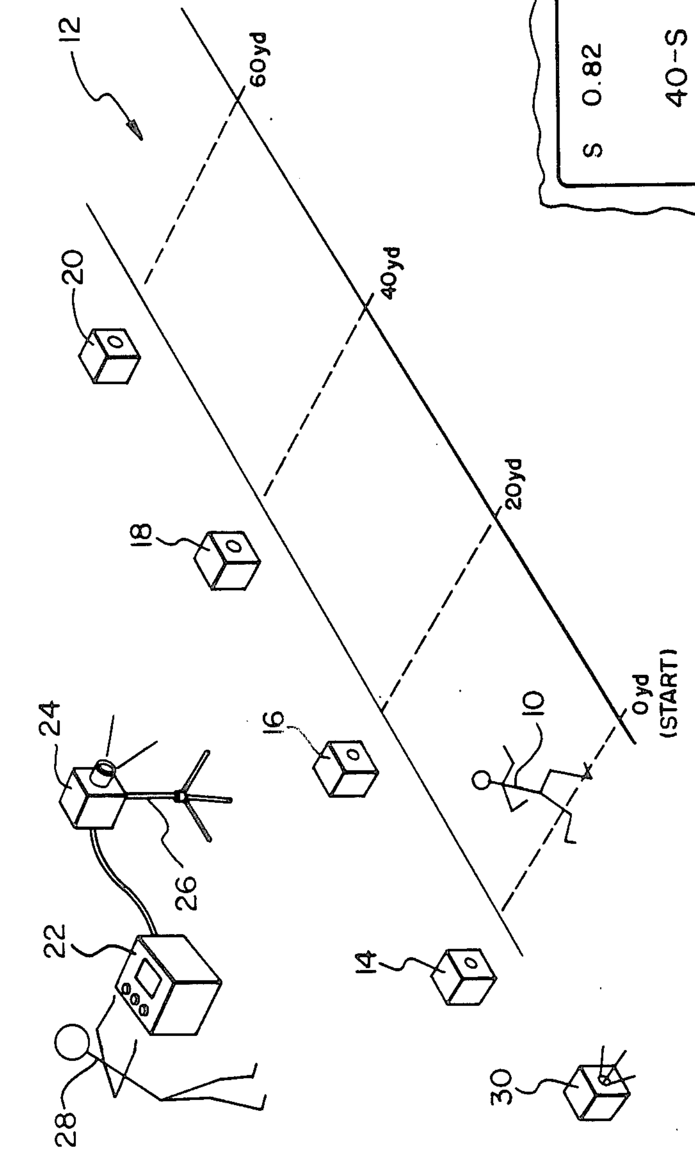
FIG. 1 is a perspective view illustrating the apparatus of the present invention as used to electronically time and record an athlete running over a prescribed course.

Although the preferred embodiment of the present inventon will be described with respect to a specific application, i.e. the timing and recording of an athlete who runs over a specific distance course, it will be understood that the apparatus of the present invention may be used in other applications in which it is desirable to electronically time and record any moving object as it travels over a measured course. As depicted in FIG. 1, an athlete 10 (such as a high school athlete being considered for an athletic scholarship, or for membership on an athletic team), is required to run over a sixty yard course as fast as he can. The course 12 is marked off in twenty-yard intervals and positioned at each interval is an ultrasonic detector for detecting the passage of athlete 10. Thus, ultrasonic detector 14 is located at the zero yard or start line. Ultrasonic detector 16 is located at the twenty yard line. Ultrasonic detector 18 is located at the forty yard line and ultrasonic detector 20 is located at the sixty yard line. Ultrasonic detectors 14, 16, 18, and 20 will be described in greater detail later, but in general, they emit an ultrasonic signal which is reflected by athlete 10 when he is intercepted by the signal. The reflected ultrasonic signal will be detected by the respective detectors 14-20 and an RF detecton signal will be sent to an RF receiver in video recording and timing apparatus 22. A video camera 24 is connected to apparatus 22 and mounted on a tripod 26. Camera 24 captures and records the run of athlete 10.

An operator 28 operates the electronic timing and recording apparatus 22 and communicates instructions to runners 10 by means of audio tones produced by audio box 30, which may be positioned close to the runner. The audio tones may be of different pitch or different quality to inform the runner that he is the next one up ("CALL"), that the should start running ("START") and that he has had a false start ("STOP"). According to an aspect of the invention, the start of timing may also be initiated by the runner as he is detected at the start or zero yard position by detector 14.

Figure 2:
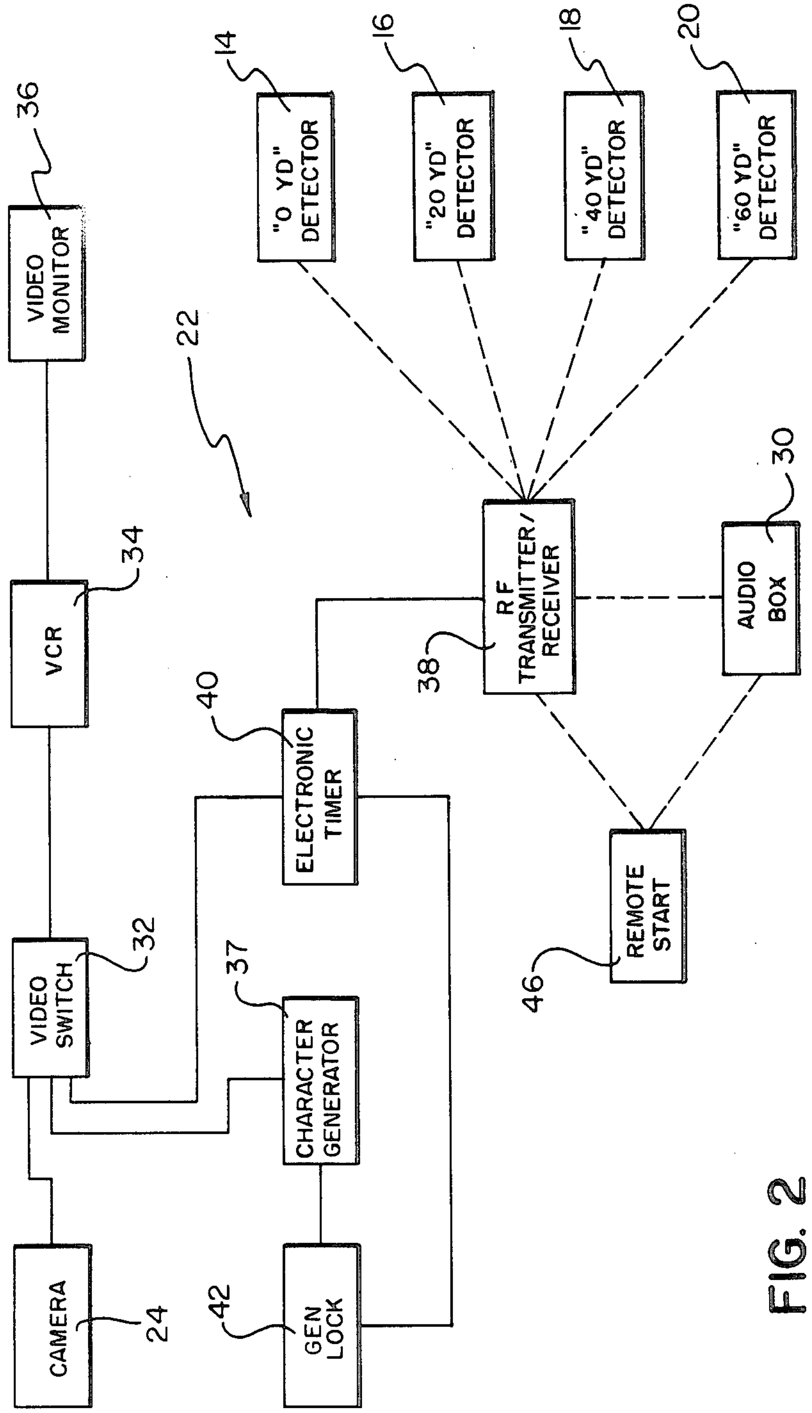
FIG. 2 is a block diagram of the apparatus of the present invention.

Referring to FIG. 2, there is shown one embodiment of the apparatus of the present invention. As shown, camera 24 is connected through a video switch 32 to video cassette recorder (VCR) 34 and video monitor 36. A known type of character generator 37 generates data on each even to be recorded by VCR 34. Such data may include the time, date of an event, descriptive material relating to the event such as the athlete's name and identification number and the like. Character generator 37 is of any well known type used with video cassette recorders, video camcorders, television sets and the like, such as the KODAK MVS 80 Character Generator sold by the Eastman Kodak Company, Rochester, N.Y.

As an athlete 10 is sequentially detected by detectors 14, 16, 18, and 20, a sequence of RF detection signals are transmitted to RF transmitter and receiver circuit 38. An electronic timer Circuit 40, which may, for example, include a microprocessor, computes the elapsed time of the runner as he passes the predetermined intervals. circuit 40 also computes the elapsed time between certain intervals. For example, the elapsed time it takes for the runner to run from the start line past the forty yard line may indicate certain athletic abilities, whereas the elapsed time that it takes the runner to run from the twenty yard line to the sixty yard line, may be useful in determining other athletic abilities. According to an aspect of the invention, the "standing start" forty yard time and the "running start" forty yard time are also recorded and displayed on monitor 36.

Timer circuit 40 also produces suitable video signals for displaying the timing information on video monitor 36 and for recording it along with the video recording to the athlete running the course produced by camera 24. Gen lock circuit 42 supplies horizontal and vertical sync signals to camera 24, to character generator 37 and to timer circuit 40 to synchronize the respective video signals produced thereby.

A remote start control 46 may be provided to start a timing sequence.

Figure 3:
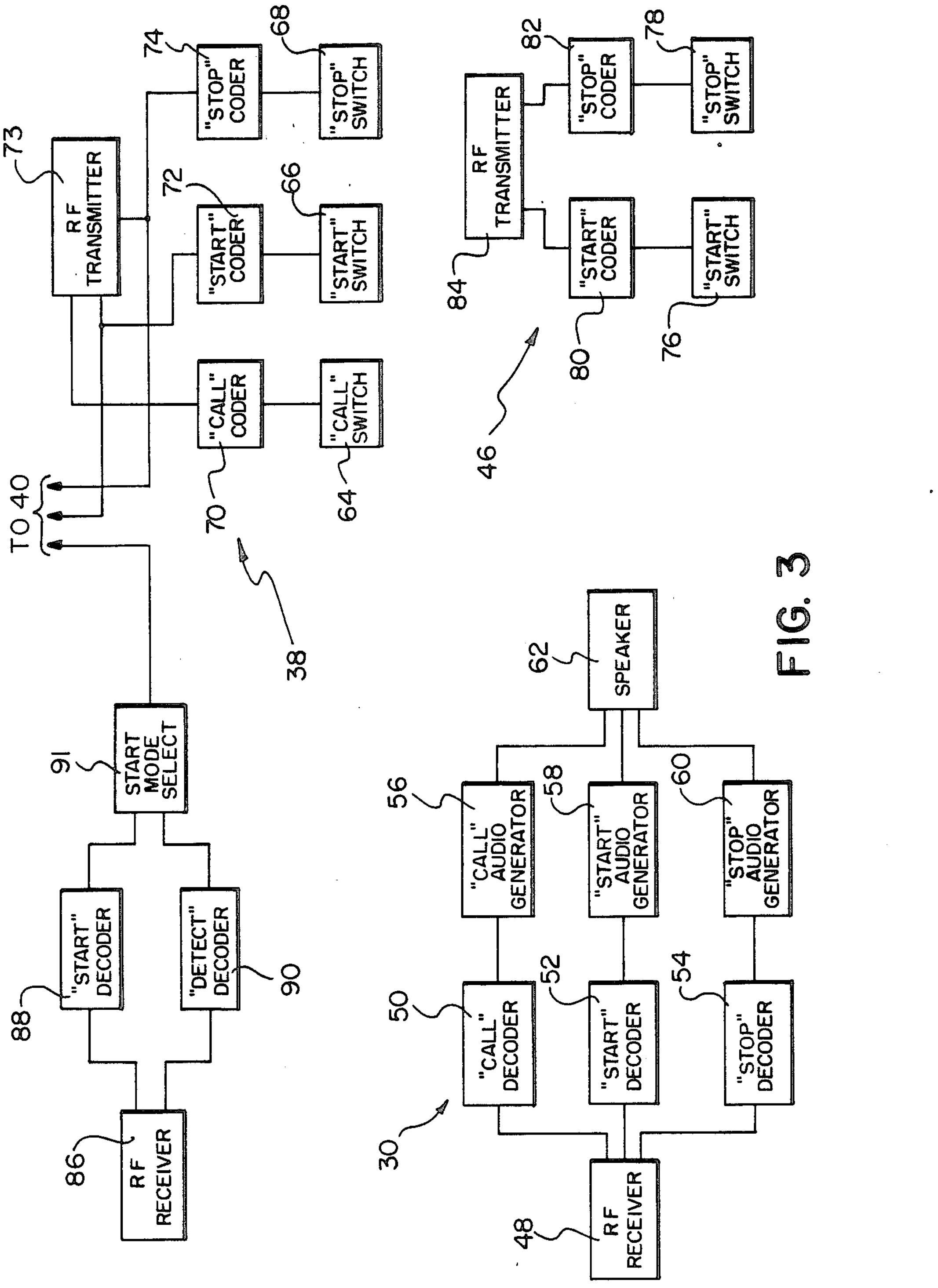
FIG. 3 is a block diagram showing greater detail of certain components of the apparatus of FIG. 2.

Referring to FIG. 3, there is shown in greater detail circuits 30, 38, and 46. As shown, audio circuit box 30 includes an RF receiver 48, RF signal decoder circuits 50, 52, and 54 and audio tone generators 56, 58 and 60 connected to speaker 62. Decoder 50 detects an RF "CALL" signal which actuates a "CALL" audio tone generator 56 to produce an autio tone which alerts the next runner to move up to the starting line to be ready to run the course. Decoder 52 detects an RF "START" signal which actuates audio tone generator 58 to produce an audio tone which starts the runner running the course. Decoder 54 detects an RF "STOP" signal which actuates audio tone generator 60 to produce an audio tone which stops the runner after he has made a false start, (i.e., started before the "START" tone is generated).

Circuit 38 includes a plurality of switches 64, 66 and 68 which respectively actuate coder circuits 70, 72 and 74 to produce a coded RF "CALL" signal, a coded RF "START" signal and a coded RF "STOP" signal. These coded RF signals are supplied to RF transmitter 73 for transmission to audio box 30.

Remote start control 46 includes manually actuatable switches 76 and 78, which respectively actuate coder 80 to produce a coded RF "START" signal and coder 82 to produce a coded RF "STOP" signal. These RF signals are transmitted by transmitter 84.

Circuit 38 also includes an RF receiver 86 for receiving either a coded RF "START" signal from remote start 46 or a coded RF detection signal from detector 14. These signals are decoded by decoder circuits 88 and 90. Start mode select circuit 91 in response to the respective signals decoded by decoders 88 and 90, sends a signal to electronic timer circuit 40 to indicate whether a runner is started by an audio tone or is self started.

Referring now to FIG. 4, there is shown in greater detail a block diagram of ultrasonic detectors 14, 16, 18 and 20. As shown, transmitter one-shot multivibrator 92 produces a a signal $S_1$ which actuates ultrasonic generator 94 to produce an ultrasonic signal $S_2$ with a duration of $S_1$. The ultrasonic signal is amplified by amplifier 96 and applied to ultrasonic transducer 98 which produces a highly directionaly ultrasonic beam which is reflected back to the detector by passage of runner 10. The reflected ultrasonic wave is detected by transducer 98. The pulse produced by one-shot 92 is also applied to receive on-shot multivibrator 102. Multivibrator 102 produces a delayed pulse which is applied to AND gate 104 along with the received detection pulse amplified by amplifier 100 and detected by detector 103. Coder 105 is actuated to cause RF generator 106 to send a burst of a coded RF detection signal to an antenna 108 for transmission to RF receiver circuit 38.

Referring to FIGS. 5*a*, 5*b*, and 5*c*, there is depicted signal diagrams illustrating the operation of the ultrasonic detector of FIG. 4. Signal $S_1$ (FIG. 5*a*) is the pulse produced by one-shot multivibrator 92. Signal $S_2$ (FIG. 5*a*) is the burst of ultrasonic frequency signal produced by ultrasonic generator 94 during the time period of signal $S_1$. Signal $S_3$ (FIG. 5*b*) is the pulse produced by receive one-shot multivibrator 102 and signal $S_4$ (FIG. 5*c*) is the reflected burst of ultrasonic signal amplified by amplifier 100.

Figure 6:
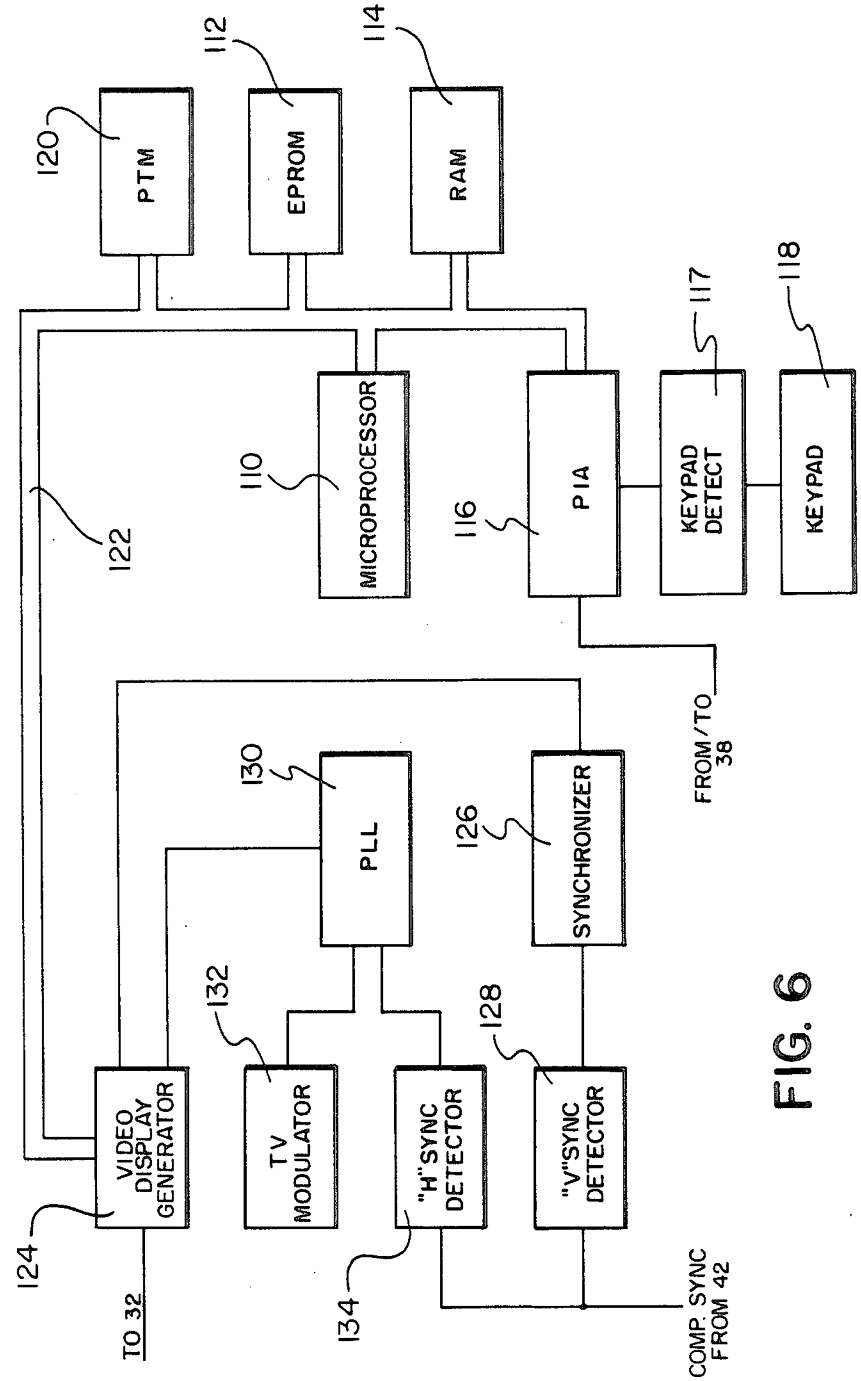
FIG. 6 is a more detailed block diagram of the electronic timer circuit of FIG. 1.

FIG. 6 shows in greater detail electronic timer circuit 40. Circuit 40 receives the RF detection signals from detectors 14, 16, 18 and 20; computes the elapsed times of the object moving over course 12 and produces appropriate video signals for recording and/or displaying the timing signals in combination with the video signals produced by camera 24 and character generator 37. Circuit 40 includes a microprocessor 110 (such as the Motorola MC6840), Erasable Programmable Read Only Memory (EPROM) 112 for storing the operating program of microprocessor 110 and Random Access Memory (RAM) 114 used for storing input-output (I/O) memory functions, program memory functions and display and timing memory functions.

A Peripheral Interface Adaptor (PIA) 116 (such as the Motorola MC6821) is used with microprocessor 110 to receive input signals from keypad 118 through keypad detector 120 and from RF circuit 38 and to send output signals to RF circuit 38. A Programmable Timer Module (PTM) 120 (such as the Motorola MC6840) provides the accurate timing necessary for computing the elapsed times of a moving object. A bus 122 provides a link between microprocessor 110, EPROM 112, RAM 114, PIA 116 and PTM 120.

Bus 122 is also linked to a Video Display Generator (VDG) 124 (such as the Motorola MC6847) which produces the video signals relating to timing information to be recorded and displayed with the video information produced by camera 24. The clock for VDG 124 is provided by synchronizer 126 which provides a clock signal which is synchronized with and which has a frequency which is a multiple of the V sync signal detected by V sync detector 128 from the composite sync signal produced by Gen Lock Circuit 42. A phase lock loop 130 locks the horizontal sync signals produced by VDG 124 and TV modulator 132 (such as Motorola MC1372) with the H sync signal detected by H sinc detector 134 from the composite sync signal from Gen Lock Circuit 42.

Programming of microprocessors including the use of various related peripheral devices is well known to those skilled in the art. A general description of the structure, operation and programming of microprocessors is presented in Chapter 11, "Microprocessors", pages 484–535. of the Harvard Textbook, "The Art of Electronics", by Horowitz and Hill, Cambridge University Press, Cambridge, 1980. A description of the structure and operation of the Motorola Microprocessor MC6809 and related peripheral devices is presented in the data handbook "Eight-Bit Microprocessor & Peripheral Data", supplied by Motorola Semiconductor Products, Inc., Austin, Tex. Further, the general design and operation of graphics overlay circuitry is also generally known to those skilled in the art. General information is described in the article, "Display-Generator Chips Implement Smart Terminals", by Peter Bissmire et al., EDN Magazine, Nov. 20, 1980. Information relating to the Motorola MC6847 is described in the Motorola Data Handbook "Eight-Bit Microprocessor & Peripheral Data", referred to above.

In operation, at the start of an event to be recorded and time, the operator 28 (FIG. 1) enters identification information relating to a runner into apparatus 22 by means of character generator 37. The operator 28 alerts the runner 10 to proceed to the start line by actuating "CALL" switch 64 which causes the audio box 30 to sound the "CALL" tone. At this time, camera 24 and VCR 34 will be actuated to record the event. The operator then chooses the mode of starting the runner, i.e., either "self start" or "signal start". If the "self start" mode is chosen, timing is initiated when the runner is detected by detector 14. An RF detection signal is sent to circuit 38, which initiates timing of the event by circuit 40.

If the "signal start" mode is selected, actuation of either "START" switch 40 or remote switch 76 intiates timing of the event. In this mode, the reaction time of the runner to an external stimulus (audio tone) is determined by the elapsed time between the "START" signal and detection of the runner by detector 14. This time is displayed in the upper left hand corner of monitor 36 (FIG. 7) as "S 0.82". In the "self start" mode the time is displayed as "S 0.00".

In the "signal start" mode a "false start" is detected when detector 14 detects the runner at the start line but no "START" signal has been given. The operator actuates "STOP" switch 68 or 78 to sound the "STOP" tone by audio box 30 to signal return of the runner to the starting line.

Figure 7:
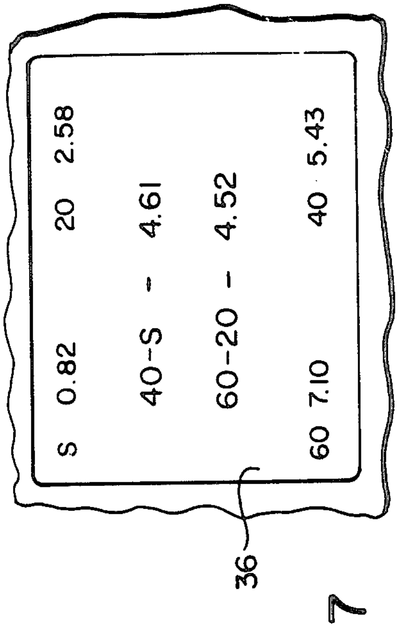
FIG. 7 is a diagrammatic view illustrating a format for displaying the timing information on a video monitor.

As the runner traverses course 12, detectors 16, 18 and 20 sequentially detect the runner and send RF detection signals to apparatus 22. Microprocessor 110 in conjunction with PTM 120, EPROM 112 and RAM 114 computes and stores the elapsed times for the runner as he passes the 20 yd. 40 yd. and 60 yd. lines. This timing information is converted by VDG 124 into suitable video signals for display on monitor 36 and for recording by VCR 34. As depicted in FIG. 7, the "20 yd.", "40 yd." and "60 yd." times are respectively displayed on monitor 36 in the upper right hand corner (i.e., "20 2.58"); in the lower right hand corner (i.e., "40. 5.43"); and in the lower left hand corner (i.e., "60 7.10"). In each of the corner displays, the left hand field (e.g., "S" "20", "40", "60") depicts the yard line crossed by the runner whereas the right hand field (e.g., "0.82", "2.58", "5.43", "7.10") depicts the corresponding time of the runner.

At the center of the monitor display (FIG. 7), are depicted standing start and running start forty yard times computed by microprocessor 110. These times give an indication of different capabilities of an athlete. The standing start time is computed by determining the runner's elapsed time from the 0 yd. (S) line to the 40 yd. line (depicted in FIG. 7 as "40-S-4.61"). The running start time is computed by determining the runner's elapsed time from the 20 yd. line to the 60 yd. line (depicted in FIG. 7 as "60-20-4.52"). It will be appreciated that other elapsed times could be determined and shown in lieu of the depicted times.

The invention has been described in detail with particular reference to preferred embodiments thereof, but it will be understood that variations and modifications can be effected within the spirit and scope of the invention.

What is claimed is:

1. Apparatus for electronically timing and recording a moving object as it travels over a measured course, said apparatus comprising:

a plurality of ultrasonic detector means positioned in predetermined spaced relationship along said course for producing a sequence of RF detection signals upon ultrasonic detection of an object travelling over said course;

timing circuit means for receiving said RF detection signals and for computing the elapsed times of travel of said object over said course as a function of said sequence of detection signals;

video recording means of capturing and recording a sequence of video frames depicting the travel of said object over said course; and means for recording the elapsed times computed by said timing circuit means along with said sequence of video frames capturing the travel of said object such that when said recorded timing information and said sequence of video frames are played back on a video monitor, the timing information is displayed along with said video frames of said travelling object.

2. The apparatus of claim 1 wherein said timing circuit means may be initiated either by means of a manually actuated control signal or by a detection signal produced b the detector means which ultrasonically detects the start of travel of said object over said course.

3. The apparatus of claim 1 wherein four ultrasonic detector means are provided respectively located at the four equally spaced positions of a course over which an athlete is to run, wherein said timing circuit means determines the respective elapsed times of the athlete as he runs past the four positions and including means for producing a display of said times in the four corners of a video monitor.

* * * * *